US010228862B2

United States Patent
Liu et al.

(10) Patent No.: US 10,228,862 B2
(45) Date of Patent: Mar. 12, 2019

(54) CAPACITY-AWARE WEAR LEVELING IN SOLID-STATE STORAGE DEVICES

(71) Applicant: Western Digital Technologies, Inc., Irvine, CA (US)

(72) Inventors: Haining Liu, Irvine, CA (US); Subhash Balakrishna Pillai, Irvine, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 3 days.

(21) Appl. No.: 15/459,339

(22) Filed: Mar. 15, 2017

(65) Prior Publication Data
US 2018/0267705 A1    Sep. 20, 2018

(51) Int. Cl.
*G06F 12/02* (2006.01)
*G06F 3/06* (2006.01)

(52) U.S. Cl.
CPC ............ *G06F 3/061* (2013.01); *G06F 3/0655* (2013.01); *G06F 3/0679* (2013.01); *G06F 12/0246* (2013.01); *G06F 2212/7211* (2013.01)

(58) Field of Classification Search
None
See application file for complete search history.

(56) References Cited

U.S. PATENT DOCUMENTS

| | | | | |
|---|---|---|---|---|
| 8,453,021 | B2* | 5/2013 | Moshayedi | G06F 11/1068 714/710 |
| 9,098,399 | B2* | 8/2015 | Ellis | G06F 12/0246 |
| 2008/0162786 | A1* | 7/2008 | Shanmuganathan | G06F 12/0246 711/103 |
| 2015/0026387 | A1* | 1/2015 | Sheredy | G11C 11/5628 711/103 |
| 2017/0357571 | A1* | 12/2017 | Souri | G06F 12/0246 |

* cited by examiner

*Primary Examiner* — Brian R Peugh
(74) *Attorney, Agent, or Firm* — Loza & Loza, LLP; Gabriel Fitch

(57) ABSTRACT

A data storage device includes a nonvolatile solid-state memory comprising a plurality of blocks and a controller configured to maintain age data associated with each of a plurality of memory units, wherein each memory unit comprises one or more of the plurality of blocks, determine a capacity of the nonvolatile solid-state memory, and perform a wear leveling operation on a first memory unit of the plurality of memory units based at least in part on the age data associated with the first memory unit and the capacity of the nonvolatile solid-state memory.

24 Claims, 5 Drawing Sheets

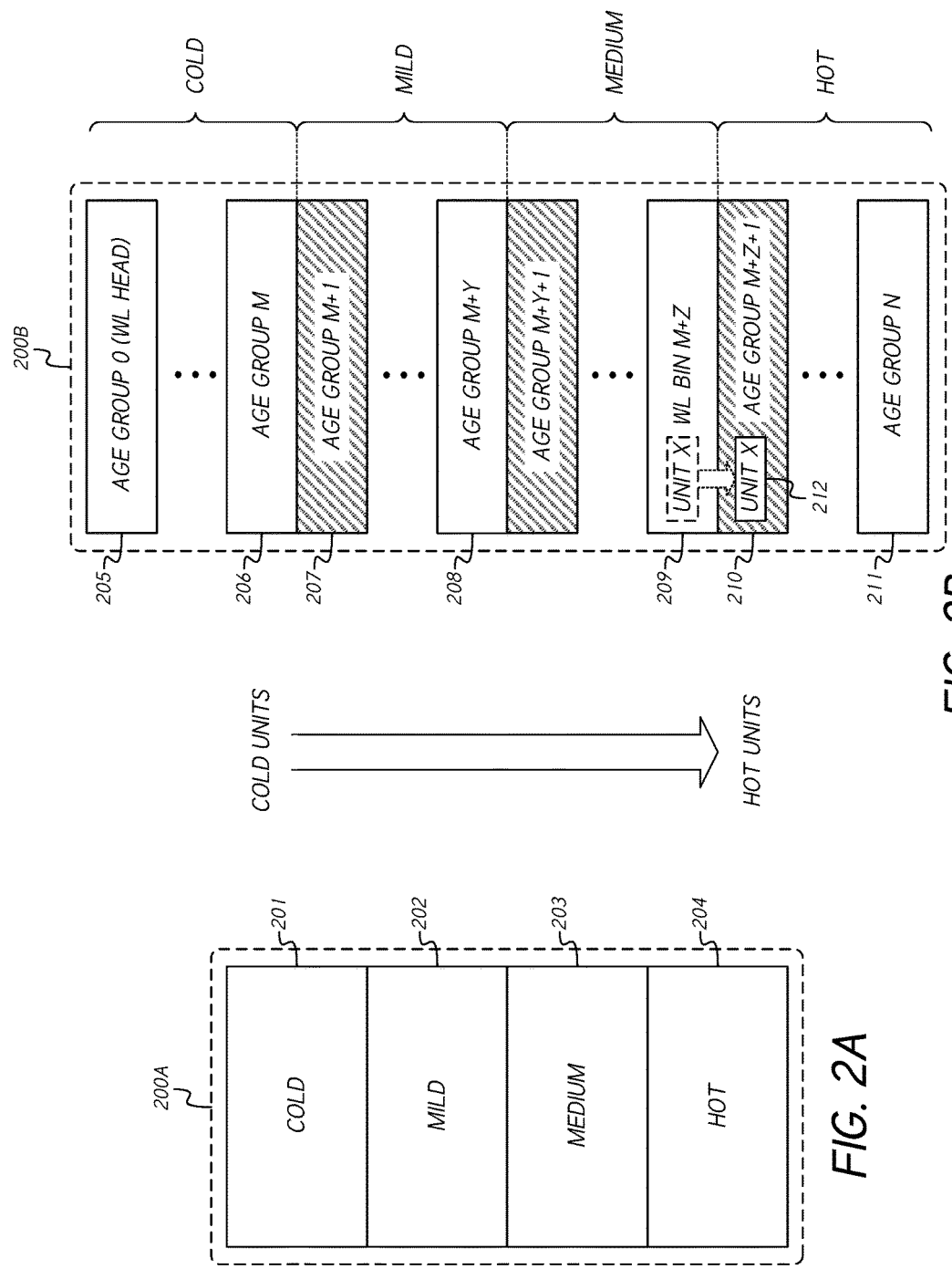

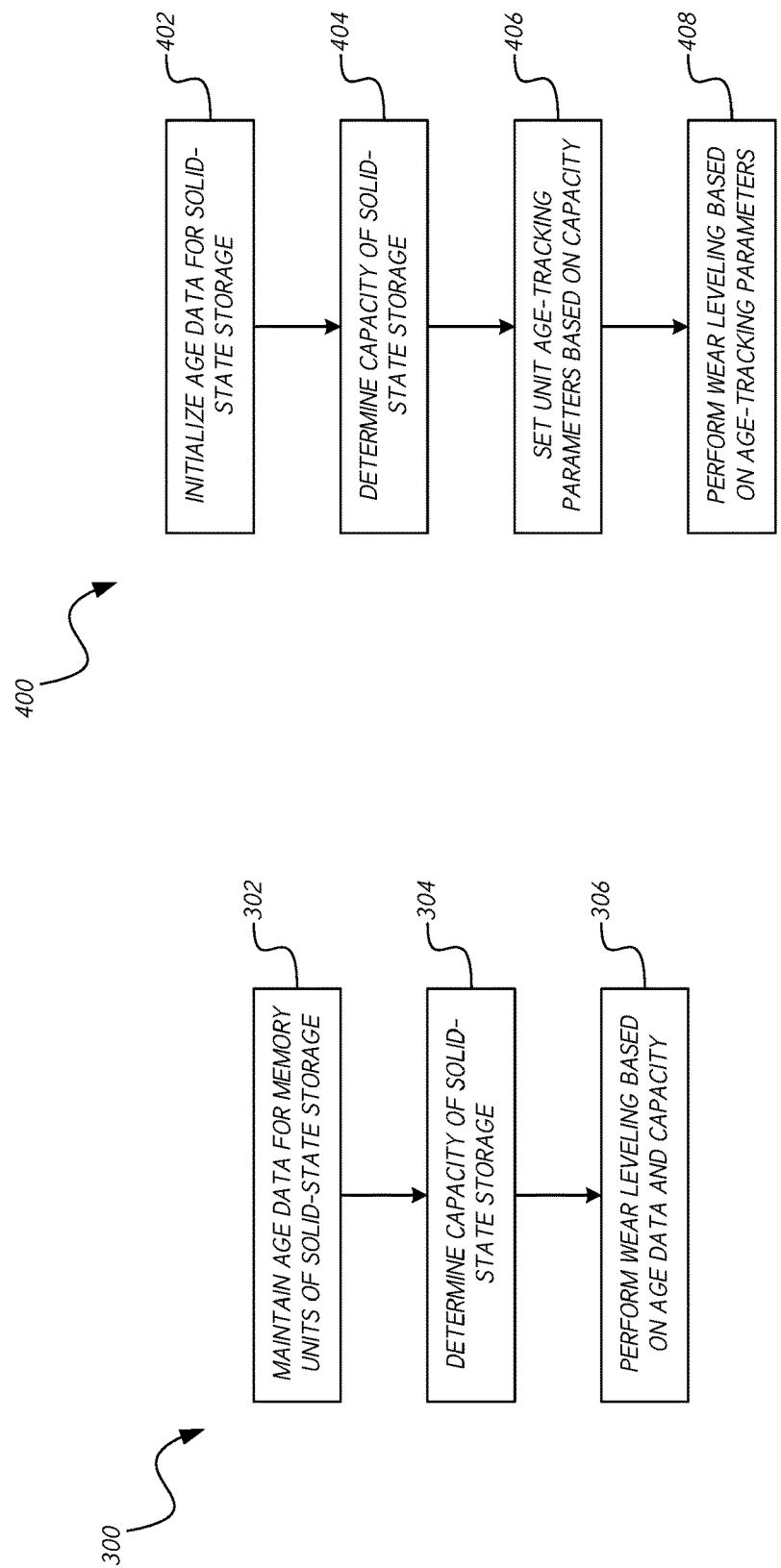

CAPACITY-AWARE WEAR LEVELING IN SOLID-STATE STORAGE DEVICES

BACKGROUND

Field

This disclosure relates to data storage systems. More particularly, the disclosure relates to systems and methods for performing wear leveling in solid-state data storage devices.

Description of Related Art

In solid-state data storage devices and systems, static wear leveling can promote even wearing of memory cells. The timing of static wear leveling and/or the number of memory units relocated during static wear leveling can be based on various parameters.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIGS. 2A and 2B illustrate solid-state memory pools that are subdivided into a plurality of age groups in accordance with one or more embodiments.

FIG. 3 is a flow diagram illustrating a process for performing capacity-aware wear leveling in accordance with one or more embodiments.

FIG. 4 is a flow diagram illustrating a process for performing capacity-aware wear leveling in accordance with one or more embodiments.

DETAILED DESCRIPTION

Figure 1:
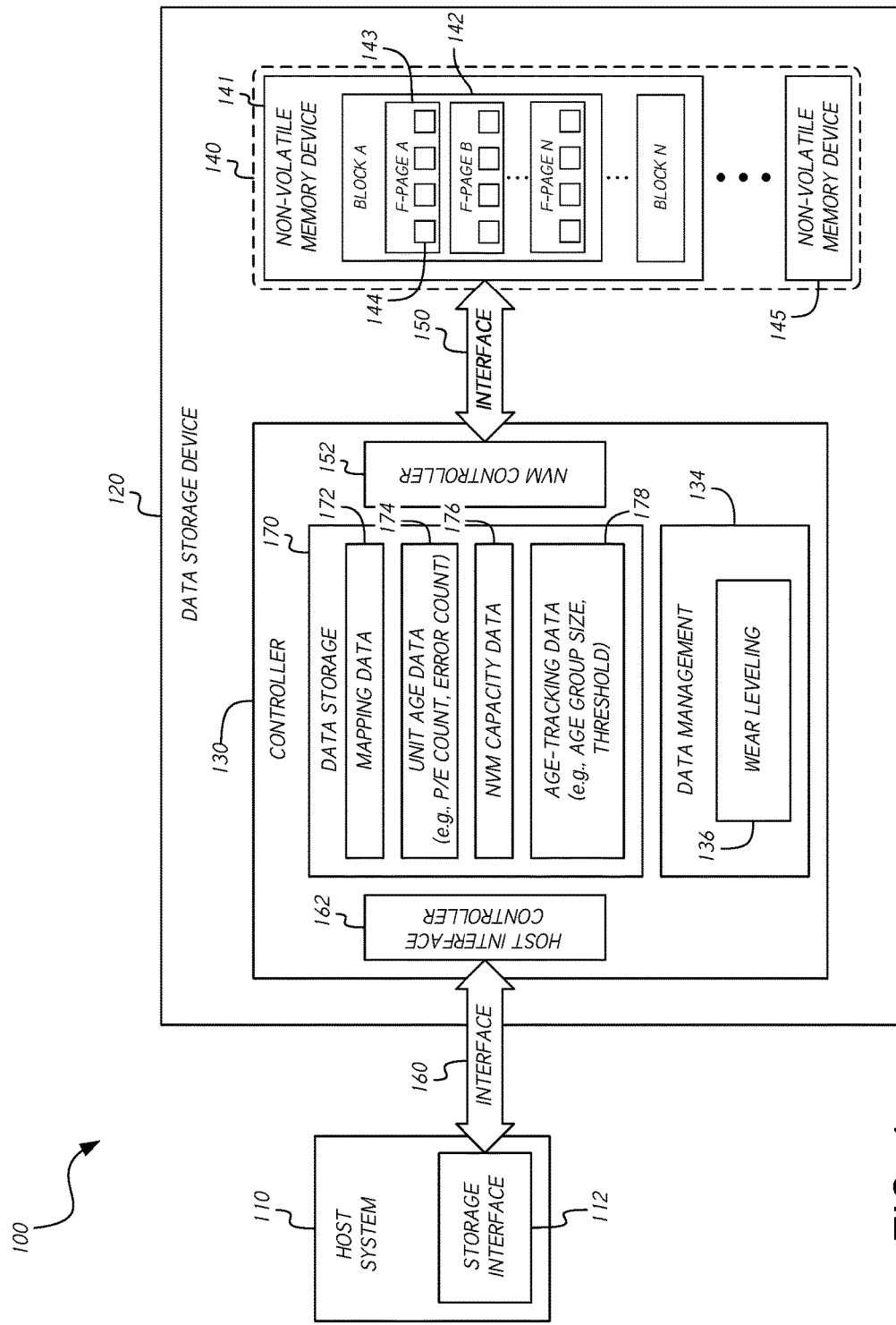
FIG. 1 is a block diagram of a data storage system in accordance with one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to backing up data in a computing system.

Overview

In solid-state memory devices, each successive erase operation executed on memory units of the solid-state memory may effectively increase the wear of the respective memory units by incrementally reducing the memory units' ability to properly retain data stored therein. Various data management operations may be implemented in storage devices comprising solid-state memory in order to improve data retention characteristics, such as, for example, wear leveling. Wear leveling may be implemented as a mechanism to prolong the useful life of solid-state memory. In some implementations, wear leveling operations involve the movement of data content from a first unit of memory, such as a block, blockset, or superblock, to a second unit of memory in order to reduce uneven wearing of the first unit of memory relative to the second unit of memory. The second unit of memory may represent a desirable location for relocating the data from the first unit of memory due to age characteristics of the second unit of memory, such as the program/erase (P/E) count of the second unit of memory. For example, if the second unit of memory has recently been erased, thereby causing the P/E count of the second unit of memory to reach a threshold level, it may be desirable to store relatively cold data (i.e., data not subject to relatively frequent cycling) in the second unit of memory so that the erase count of the second unit of memory does not become disproportionately high relative to other memory units in the data storage device/system. When the data is moved from the first memory unit to the second memory unit, the first memory unit may then be erased and made available for future write operations. In some implementations, the process of wear leveling may promote more even spreading of erase operations across memory units in the solid-state memory device or system. For example, wear leveling processes can be implemented to help prevent certain memory units of solid-state memory devices/systems from receiving an excessive amount of erase operations relative to other blocks, and thus experiencing data failures earlier and/or at a higher rate than other memory units of the device/system.

In some implementations, wear leveling may be managed and directed by a controller or control circuitry associated with a solid-state memory device or system. Due to various cost and/or practicality considerations, a single design or configuration of a solid-state memory controller may be designed for use across a variety of solid-state memory geometries and/or devices. That is, a single controller design may be configured to be implemented in a variety of solid-state drives, wherein each of the drives has a similar input/output speed, such as a similar write speed, but may have distinctly different solid-state memory (e.g., NAND flash) geometry. The term "drive" is used herein according to its broad and ordinary meaning, and may refer to any type or layout of solid-state device(s) or system(s) that may be coupled to a controller configured to execute data management operations therein. It may be desirable for such a controller to be configured to implement a wear leveling scheme that provides a relatively unified solution for interfacing with variations in solid-state device layout and/or geometry.

Embodiments disclosed herein provide for controller-implemented wear leveling schemes designed to account for the capacity of the associated solid-state device/system as a parameter on which the static wear leveling strategy is based. For example, in some embodiments, the resolution of the static wear leveling monitoring mechanism may be relatively smaller for drives having relatively large capacity compared to relatively smaller-capacity drives. The terms "resolution," "intensity" and "granularity" with respect to wear leveling implementation are used herein according to their broad and ordinary meanings. The terms "resolution," "intensity," and/or "granularity" may be used substantially interchangeably in certain contexts herein in connection with certain embodiments. When implementing wear leveling, it may be impractical and/or technically prohibitive to control and/or monitor memory units for wear leveling purposes with each increment of the age of the memory units (e.g., P/E count). Therefore, resolution settings may be utilized to implement the control and/or monitoring of the memory pool for wear leveling purposes according to larger units, such as at multiples of the relevant age increment unit (e.g., after a predetermined multiple of P/E count).

The inverse relationship between drive capacity and wear leveling resolution/intensity may appear counterintuitive, but may nevertheless provide desirable adaptive wear leveling that is appropriate across a variety of drive geometries and/or layouts. For example, as drive capacity decreases, the amount of memory units thereof (e.g., NAND flash blocks) may likewise decrease. As a result, the P/E count of a single memory unit may have a relatively higher statistical significance, and therefore the capacity of the relatively small drive capacity may likewise have relatively higher significance. Therefore, in an embodiment of a wear leveling scheme incorporating drive capacity as a parameter in determining when to initiate wear leveling with respect to one or more particular memory units, the capacity parameter as implemented in the wear leveling algorithm may have a relatively greater weight or value; the value or weight of the capacity parameter in the wear leveling algorithm may have a substantially inverse proportional relationship with the capacity of the drive. Embodiments disclosed herein may therefore provide improved, customized static wear leveling schemes, which may advantageously result in more consistent performance and/or better endurance of the solid-state drive.

Although certain embodiments are disclosed herein in the context of solid-state data storage devices and systems, it should be understood that certain features disclosed herein may be applicable devices/systems incorporating one or more other types of data storage, such as magnetic media, or other volatile or nonvolatile memory. As used in this application, "nonvolatile solid-state memory," "nonvolatile memory," "NVM," or variations thereof may refer to solid-state memory such as NAND flash. However, the systems and methods of this disclosure may also be useful in more conventional hard drives and hybrid drives including both solid-state and hard drive components. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), MRAM, or other discrete NVM (nonvolatile solid-state memory) chips. The nonvolatile solid-state memory arrays or storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Data Storage System

FIG. 1 is a block diagram illustrating an embodiment of a system 100 including a combination of a host system 110 and a data storage device 120 incorporating capacity-aware wear leveling in accordance with one or more embodiments disclosed herein. The data storage device 120 may be any type storage device, module, component, system, or the like. Furthermore, the terms "drive" and "data storage drive" may be used herein in certain contexts refer to any type storage device, and may be used substantially interchangeably with the term "data storage device" in some contexts. For example, the terms "drive," "solid-state drive," and the like, may be used to refer to a data storage device, which may be embodied in a board having one or more solid-state memory chips mounted thereon or associated therewith, wherein the board may be disposed within a housing, or the like. With respect to the system 100 of FIG. 1, the terms "data storage drive" and/or "solid-state drive" may refer to the data storage device 120 and/or the nonvolatile memory 140.

As shown, the data storage device 120 (e.g., hybrid hard drive, solid-state drive, or any storage device utilizing solid-state memory, etc.) includes a controller 130 (e.g., control circuitry) configured to receive data commands from the host system 110, and to execute such commands in the nonvolatile memory 140. In certain contexts, the nonvolatile memory 140 and/or the individual nonvolatile memory devices (141, 145), may be considered nonvolatile memory arrays. The commands receive and/or executed by the controller 130 may include, for example, read/write commands, and the like. The controller 130 may comprise one or more processors, memory devices, data and/or power transmission channels/paths, boards, or the like. In certain embodiments, one or more components of the controller 130 may be mounted on a printed circuit board (PCB). The controller 130 may be configured to receive data commands from a storage interface (e.g., a device driver) 112 residing on the host system 110. The controller 130 may communicate with the host system 110 over a host interface 160 and receive the data storage access commands using the host interface 160. The host interface 160 may comprise any suitable or desirable communication protocol, including, but not limited to, USB, SCSI, PCIe, or the like.

The data storage device 120 is configured to store data received from the host system 110, such that the data storage device 120 acts as data storage for the host system 110. To facilitate this function, the controller 130 can implement a logical interface. The logical interface can present to the host system 110 memory as a set of logical addresses (e.g., sequential/contiguous addresses) where data can be stored. For example, host data storage access commands may specify a logical block address in the data storage device 120. Internally, the controller 130 may be configured to map the logical addresses to respective physical memory addresses in the nonvolatile solid-state memory 140 and/or other memory module(s). In certain embodiments, the data storage 170 of the controller 130 may be configured to load mapping data 172, which may be loaded from the nonvolatile memory 140 in certain embodiments. The mapping data 172 may be flushed to the nonvolatile memory 140 prior to power down of the data storage device 120 in order to allow for the restoration of the mapping data following a power cycle. The mapping data 172 may indicate the mappings of logical addresses to physical addresses. For example, the mapping data 172 may comprise one or more mapping tables, which may be periodically and/or sporadically updated to reflect locations of data within the nonvolatile memory 140.

In certain embodiments, the nonvolatile memory 140 comprises one or more blocks of storage, identified as Block "A" 142 through Block "N." Each block may comprise a plurality of flash pages (F-pages). For example, Block A 142 of FIG. 1 includes a plurality of F-pages, identified as F-pages A 133, B, through N. In some embodiments, each F-page is a smallest grouping of memory cells in the nonvolatile memory array 140 that can be programmed in a single operation or as a unit. Further, each F-page may include a plurality of code words, such as error-correcting pages (E-pages). In the illustrated embodiment, each F-page includes four E-pages that are illustrated as four boxes, including E-page 144. Other embodiments may use F-pages or E-pages that are defined differently or each F-page may include greater or fewer than four E-pages. Groups of blocks may collectively make up blocksets and/or "superblocks." Although blocks, blocksets, pages, superblocks, and the like, are disclosed herein with respect to solid-state memory operations, it should be understood that the various data management operations disclosed herein may be performed on, or using, any size or type of unit of solid-state memory (i.e., "memory unit"). For example, memory units on which wear leveling operations are performed in accordance with the present disclosure may comprise individual blocks, blocksets, or superblocks. For example, a superblock may comprise a group of memory blocks. In certain embodiments, each block in a superblock may be on one die of the group dies of a solid-state memory module. In certain embodiments, a superblock comprises blocks from various planes of a group of dies, or multiple blocks within a superblock may be on the same die or plane.

The data management module 134 of the controller 130 may be configured to implement one or more data management operations, such as wear leveling operations, as represented by the wear leveling module 136. The controller 130 may maintain certain operational data (e.g., age data 174, capacity data 176, age-tracking data 178), which may be used in data management operations. For example, the controller 130 may implement a wear leveling scheme as a means for prolonging the lifecycle of one or more memory units of the nonvolatile memory 140. At least some of the data maintained in the data storage 170 may be used as a parameter for determining when and/or where wear leveling operations are to be performed to promote a desirably uniform application across the nonvolatile memory 140, or subsection thereof. The data management module 134 may represent a flash translation layer (FTL).

The unit age data 174 maintained by the controller 130 may be used to determine when and/or how to relocate data for wear leveling purposes. As referenced above, the endurance of solid-state memory may be negatively impacted by charge leakage from floating gate areas of transistors that make up the solid-state memory. The ability of the transistor cells to maintain program to charge levels over data retention periods can degrade over time, particularly when subject to large numbers of program/erase (P/E) operations/cycles. Wear leveling may allow for the controller 130 to maintain blocks, or other memory units, of the nonvolatile memory 140 at or around the same endurance conditions (e.g., P/E cycle count). To such end, the controller 130 may be configured to track the number of P/E cycles experienced by each tracked unit of memory, and use such data to advantageously relocate frequently-cycled data (i.e., "hot data") to memory units (e.g., blocks) having relatively low P/E cycle count and/or to relocate infrequently-cycled data (i.e., "cold data") to memory units having relatively high P/E cycle count. In some implementations, the controller 130 is configured to measure error conditions of the various memory units of the nonvolatile memory 140 in order to determine where and/or when to relocate data as part of a static wear leveling scheme. The controller 130 may be configured to detect and track data errors occurring when data is read from memory units of the nonvolatile memory 140, wherein when read data errors occur, the controller 130 may be configured to determine a retention age of the memory unit(s) based on the number of errors.

In certain embodiments, the wear leveling module 136 may be configured to recognize when a wear leveling condition with respect to one or more memory units of the nonvolatile memory 140 has been met. The wear leveling condition may indicate that the wear level of the memory units (e.g., block) has crossed a threshold level, indicating that the memory unit has data stored therein that should be relocated in order to promote even wear across a range of memory units. The wear level may be based on one or more of P/E counts, times since last programming, error rate, or the like. In some implementations, the unit age data 174, such as P/E cycle count, error count, etc., may be interpreted in view of age-tracking data 178, which may specify how memory units of the nonvolatile memory 140 are divided into age groups indicating the age, or ripeness, thereof for wear leveling purposes. The age-tracking data 178 may further indicate the threshold levels that determine when a memory unit is to be selected for wear leveling due to the crossing of the threshold.

In addition to the age of memory units, certain embodiments disclosed herein account for the capacity of the nonvolatile memory 140 when determining when and/or where to perform wear leveling. The capacity data 176 may be different for different types of nonvolatile memory. That is, the capacity of the particular nonvolatile memory array 140 may be represented in the capacity data 176, such that the controller 130 can implement a customized data management solution based on the specifications of the nonvolatile memory that happens to be coupled to the controller 130 in the particular system. Although nonvolatile memory devices and arrays that may be used with the controller 130 may have similar write speeds due to similar overprovisioning ratios, the different memories may nevertheless have different storage capacities, which can affect the effectiveness of a wear leveling scheme. For example, the controller 130 may be configured to be used in connection with a 2 TB, 4 TB, and 8 TB memories. Furthermore, different storage drives with which the controller 130 may be coupled may comprise different numbers and/or configurations of memory chips/dies, banks, channels and/or different densities within chips/dies. Whereas the controller 130 may be designed such that write speeds (e.g., sequential or random) may be substantially the same regardless of the size or geometry of the nonvolatile memory 140 due to the utilization of the same overprovisioning ratio in different instances, the same host write speed may translate to different block rotation dynamics in connection with wear leveling for different pool sizes of the nonvolatile memory connected to the controller 130. That is, the internal dynamics in terms of static wear leveling may be substantially different for different types of nonvolatile memory, and therefore the wear leveling scheme may not operate as effectively across different storage drives.

In some embodiments, the wear leveling module 136 is designed to monitor the unit age data 174 and track wear leveling ripeness by dividing the memory units of the nonvolatile memory 140 into a finite number of age groups, each age group representing a separate age range. In one embodiment, for example, the age-tracking data 178 may define age groups such that a maximum P/E cycle count difference between the oldest age group and the youngest age group is limited to a pre-defined range, such as a difference of 512, or other amount.

Capacity-Aware Wear Leveling

With respect to wear leveling processes, the capacity of a nonvolatile memory system may define the size of the pool in which the memory units (e.g. blocks, blocksets, superblocks, etc.) reside. In some implementations, the impact of a single memory unit of the pool is inversely proportional to the capacity of the pool (i.e., the drive capacity). That is, the bigger the capacity of the pool, the smaller the impact of an individual memory unit thereof on the overall wear leveling process. As described herein, the impact of a memory unit on the wear leveling process refers to a sensitivity of the data storage system performance to the wear leveling management of the memory unit. In order to maintain a relatively consistent performance across solid-state drives having different capacities, it may be desirable to account for drive capacity in implementing the relevant wear leveling scheme.

Capacity-aware wear leveling processes in accordance with the present disclosure may be initiated when a triggering condition is met. For example, the triggering condition may be met by the lapsing of a predetermined time, or when the cycle count or other age metric associated with one or more memory units reaches a threshold level, or when one or more memory units is determined to have reached a substantially degraded level of performance. The data management associated with the data storage drive may be configured to categorize memory units of solid-state memory into separate age groups, which may be referred to in certain contexts as "bins", "buckets," or other term, wherein the different age groups represent memory units having a data retention age (e.g., P/E count) within one of a series of graduated ranges. FIGS. 2A and 2B illustrate solid-state memory pools (200A, 200B) that are subdivided into a plurality of age groups. The diagram of FIG. 2A shows the pool 200A subdivided into four age groups, namely COLD 201, MILD 202, MEDIUM 203, and HOT 204. Although for age groups are shown, it should be understood that such representation is shown for illustration purposes only and that solid-state memory pools used for capacity-aware wear leveling in accordance with the present disclosure may have any number of age groups or configuration of age group subdivision. In the diagrams of FIGS. 2A and 2B, the age groups are arranged in a progressive distribution from cold to hot, as shown, wherein the uppermost illustrated age groups represent the coldest age groups, whereas the bottom age groups represent the hottest age groups. As described above, "cold" may be used herein to refer to memory units and/or data having relatively low age characteristics (e.g., cycle count), whereas "hot" may be used herein to refer to memory units and data having relatively high age characteristics (e.g., cycle count).

The categorization of memory units into age groups, as shown in FIGS. 2A and 2B, can facilitate the tracking of memory unit ages in a relatively simplified manner. In certain embodiments, a maximum allowed difference between ages, or erase counts, between the coldest and hottest age groups may be enforced. For example, in certain embodiments, wear leveling is implemented in order to maintain a less than 512 erase count difference between the hottest and coldest age groups and/or memory units. In some embodiments, the solid-state memory pool may be divided into eight age groups. For example, the pool 200B of FIG. 2B illustrates eight separate age groups. However, as is clear from the illustration of FIG. 2B, the pool 200B may include additional age groups in the various categories (i.e., COLD, MILD, MEDIUM, HOT), and solid-state memories may be subdivided into any number of distinct age groups within the scope of the present disclosure.

With further reference to FIG. 2B, the memory units, or blocksets, with the lowest erase counts (i.e., cold units), may belong to the group of age groups identified as COLD age groups. In certain embodiments, the lowest of the age groups 205 may be identified as the wear leveling head group. In certain embodiments, the different age groups may be utilized a rotating fashion. For example, when the erase count for a given memory unit or blockset is incremented above the upper limit of the erase count range (and/or range associated with other age metric, such as error count, time since last cycle, etc.) for the current age group, the unit may be re-characterized to the next hotter age group. When all of the units assigned to the head age group are moved up to the next age group, the head age group designation may be reassigned to the next hotter age group, and the previous head age group 205 may be re-designated as the hottest age group designated for memory units having the highest erase counts, for example.

In certain implementations, wear leveling functionality may be configured to initiate static wear leveling when the P/E count difference between memory units exceeds certain thresholds. For example, the pool 200B may be subdivided into threshold groupings, such as the identified COLD, MILD, MEDIUM, and HOT groupings shown in FIG. 2B, or any other grouping of age groups. Although four groupings of age groups are shown, it should be understood that the pool 2008B may have any number of threshold groupings of age groups. In certain embodiments, the coolest age group (e.g. age group 210) of a given threshold grouping (e.g., HOT grouping) may represent a threshold age group, wherein graduation into the threshold age group from the next coldest age group may trigger static wear leveling to reclaims a certain number of memory units from the head group and use such memory units to write hot data. For example, during runtime, each time a memory unit is erased, its P/E count may be incremented, after which it may be determined whether the erased unit has moved to a threshold age group. The number of memory units reclaimed in the wear leveling operation may depend on the threshold level for the age group to which the erased memory units is moved. For example, graduation of memory units to the HOT grouping may trigger relocation of a greater number of memory units than graduation to the MEDIUM grouping. The identification of age groups as threshold age groups may be based at least in part on the capacity of the storage drive.

Wear leveling may be triggered according to any suitable or desirable mechanism within the scope of the present disclosure. For example, when the number of memory units associated with the coldest age group is a threshold value greater or less than the number of memory units associated with the hottest age group, such difference may trigger static wear leveling. Furthermore, the differences between the numbers of memory units associated with intermediate age groups may also factor into wear leveling triggering in some embodiments. In certain embodiments, the level of wear leveling may be less when a memory unit transitions from a cold grouping to a mild grouping relative to a transition from medium grouping to hot grouping, for example.

As described above, each of the age groups may cover a range of P/E cycles, and/or range related to one or more other age-related metrics. Therefore, based on the size of the pool 200B, the selected size of the range of individual age groups may determine the number of age groups that the pool 200B is subdivided into. In certain embodiments, the selection of the ranges for the individual age groups and/or the number of age groups into which the pool 200B is subdivided may depend at least in part on the capacity of the pool 200B. In certain embodiments, the higher the capacity associated with the pool, the greater the range covered by an individual age group. Furthermore, in certain embodiments, the higher the capacity, the fewer the total number of age groups. That is, for smaller-capacity drives, the pool may be subdivided into a larger number of age groups. Therefore, the number of age groups used can be dependent on drive capacity, thereby allowing for a single controller to be capable of providing enhanced flexibility for wear leveling for a variety of different drives having different storage capacities. The following example is illustrative of the possible relationship between drive capacity and the number of age groups and/or P/E cycle count ranges for individual age groups in accordance with embodiments of the present disclosure. For example, an 8 TB solid-state drive may comprise approximately 512 dies and/or approximately 16K blocksets (e.g., superblocks). With respect to wear leveling for such drive, the P/E counts of the pool of blocksets may be monitored using eight age groups, wherein the use of eight age groups is based on the size of the drive. Alternatively, drives having other sizes may use a different number of age groups. For example, for a 4 TB drive comprising 256 dies and/or 8K blocksets, the P/E counts of the pool of blocksets may be monitored using 16 age groups. In certain embodiments, the configuration of age groups (e.g., number of age groups) is determined in connection with a boot process (e.g., initialization stage) for the drive.

In certain embodiments, age group distribution of memory units may be analyzed using a distribution curve, wherein triggering of wear leveling, and the extent of wear leveling, may be based on analysis/processing of the distribution curve.

FIG. 3 is a flow diagram illustrating a process 300 for performing capacity-aware wear leveling in accordance with one or more embodiments of the present disclosure. At block 302, the process 300 involves maintaining age data for memory units of a solid-state storage drive. For example, the process 300 may involve initializing one or more data structures maintained for static wear leveling operation.

At block 304, the process 300 involves determining a capacity of the solid-state storage drive. For example, the process 300 may involve reading the capacity of the pool size of the solid-state memory, which may indicate how many blocks or memory units for data storage are in the solid-state drive. In some implementations, the capacity data may be obtained through a runtime scan of the solid-state drive, which may advantageously provide dynamic capacity data.

At block 306, the process 300 involves performing wear leveling on the solid-state drive based at least in part on the age data obtained at block 302, as well as the capacity data obtained a block 304. For example, the granularity or resolution of the run-time monitoring for the wear leveling scheme may be at least partially dependent on the capacity of the storage drive. Capacity-dependent wear leveling may advantageously result in more consistent performance and/or better endurance for the solid-state drive. In certain embodiments, the drive capacity, or the actual flash geometry of a drive, may be obtained during run-time in connection with the initialization of the drive. The capacity/geometry information may be fed into the wear leveling initialization process, wherein the wear leveling engine is configured to take these parameters (e.g., run-time configurable) during its initialization. The wear leveling module/engine may then adapt the wear leveling control accordingly, such as with respect to the intensity of the wear leveling triggered relocation, and/or the like.

FIG. 4 is a flow diagram illustrating a process 400 for performing capacity-aware wear leveling in accordance with one or more embodiments of the present disclosure. At block 402, the process 400 involves initializing age data for solid-state storage. Such initialization may involve establishing baseline age-related readings for the solid-state drive and/or data associated with the drive. At least some of the data may be obtained through the reading of data parameters that may be maintained in the solid-state storage drive and/or other associated circuitry or components. The initialization of the age data may involve assessing the age variation across a range of memory units of the solid-state drive.

At block 404, the process 400 involves determining a capacity of the solid-state storage drive. The capacity of the solid-state storage drive may be determined or derived in any suitable or desirable manner accordance with the present disclosure.

At block 406, the process 400 involves setting memory unit age-tracking parameters based on the determined capacity. For example, as described above in connection with FIGS. 2A and 2B, the wear leveling scheme associated with the process 400 may involve the tracking of memory units in different age groups, wherein the age groups are defined by a range of program/erase (P/E) cycle counts and/or one or more other age-related metrics. This step at block 406 may involve setting the ranges of the age groups of the pool and/or setting the number of age groups into which the pool is subdivided, based at least in part on the determined capacity.

At block 408, the process 400 involves performing wear leveling on the solid-state storage based at least in part on the age-tracking parameters determined at block 406, which are based at least in part on the determined capacity. Therefore, the wear leveling associated with the process 400 may utilize the drive capacity as an input parameter, advantageously providing a customized wear leveling solution for the solid-state storage drive.

Figure 5:
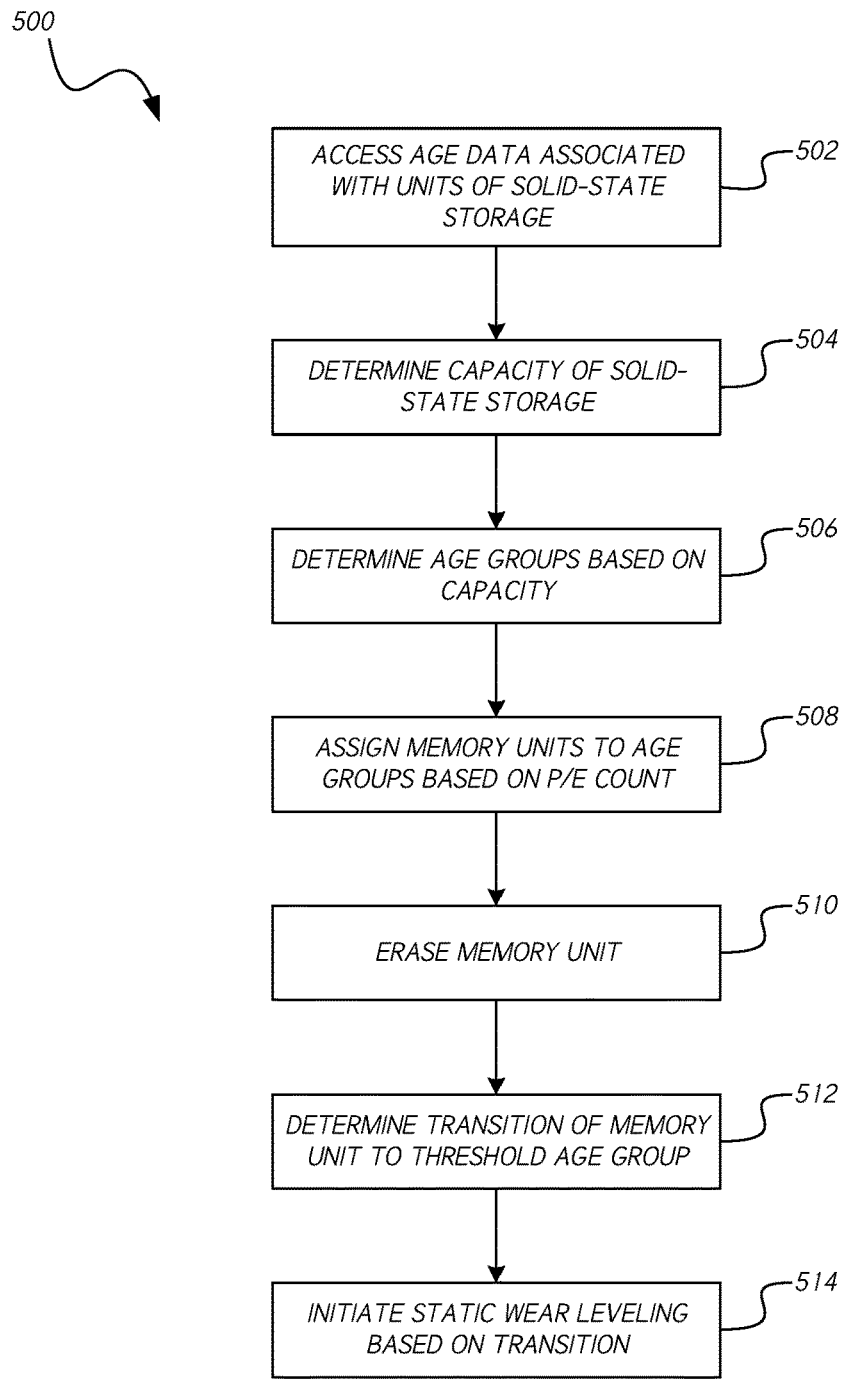
FIG. 5 is a flow diagram illustrating a process for performing capacity-aware wear leveling in accordance with one or more embodiments.

FIG. 5 is a flow diagram illustrating a process 500 for performing capacity-aware wear leveling in accordance with one or more embodiments of the present disclosure. At block 502, the process 500 involves accessing age data associated with memory units (e.g., blocks or blocksets) of a solid-state storage module. At block 504, the process 500 involves determining the capacity of the solid-state storage module. The capacity of the solid-state storage module may be determined in a suitable or desirable way, such as through a reading of the capacity from the solid-state storage module itself, or accessing the capacity, or capacity-related data, from any other data storage module, and/or over a host connection.

At block 506, the process 500 involves determining age groups for grouping the memory units of the solid-state storage module based on the capacity of the solid-state storage module. At block 508, the process 500 involves assigning individual memory units (e.g., blocks, blocksets) to the various age groups determined at block 506 based at least in part on program/erase (P/E) count data associated with the individual memory units.

At block 510, the process 500 involves erasing a memory unit. For example, with reference back to FIG. 2B, the erased memory unit may be represented by the Unit X 212 shown in FIG. 2B. At block 512, the process 500 involves determining that the erased memory unit has transitioned to a threshold age group. For example, as shown in FIG. 2B, Unit X, as a result of a P/E cycle, may graduate from one age group 209 to the next hotter age group 210. As shown in FIG. 2B, the age group 210 may represent a threshold age group (the boxes having a diagonal-line fill pattern may represent threshold age groups for each of the sub groupings—COLD, MILD, MEDIUM, HOT).

At block 514, the process 500 involve initiating static wear leveling based on the determined transition of the erased memory unit. For example, with reference to FIG. 2B, static wear leveling may be triggered by the transition of Unit X from the age group 209 to the age group 210, wherein said wear leveling may involve relocating data stored in Unit X to one or more memory units currently associated with the head age group 205, thereby ultimately resulting in the migration of one or more memory units associated with the head age group into hotter age groups, which may serve to create more even wear among memory units in the pool 200B.

Figure 6:
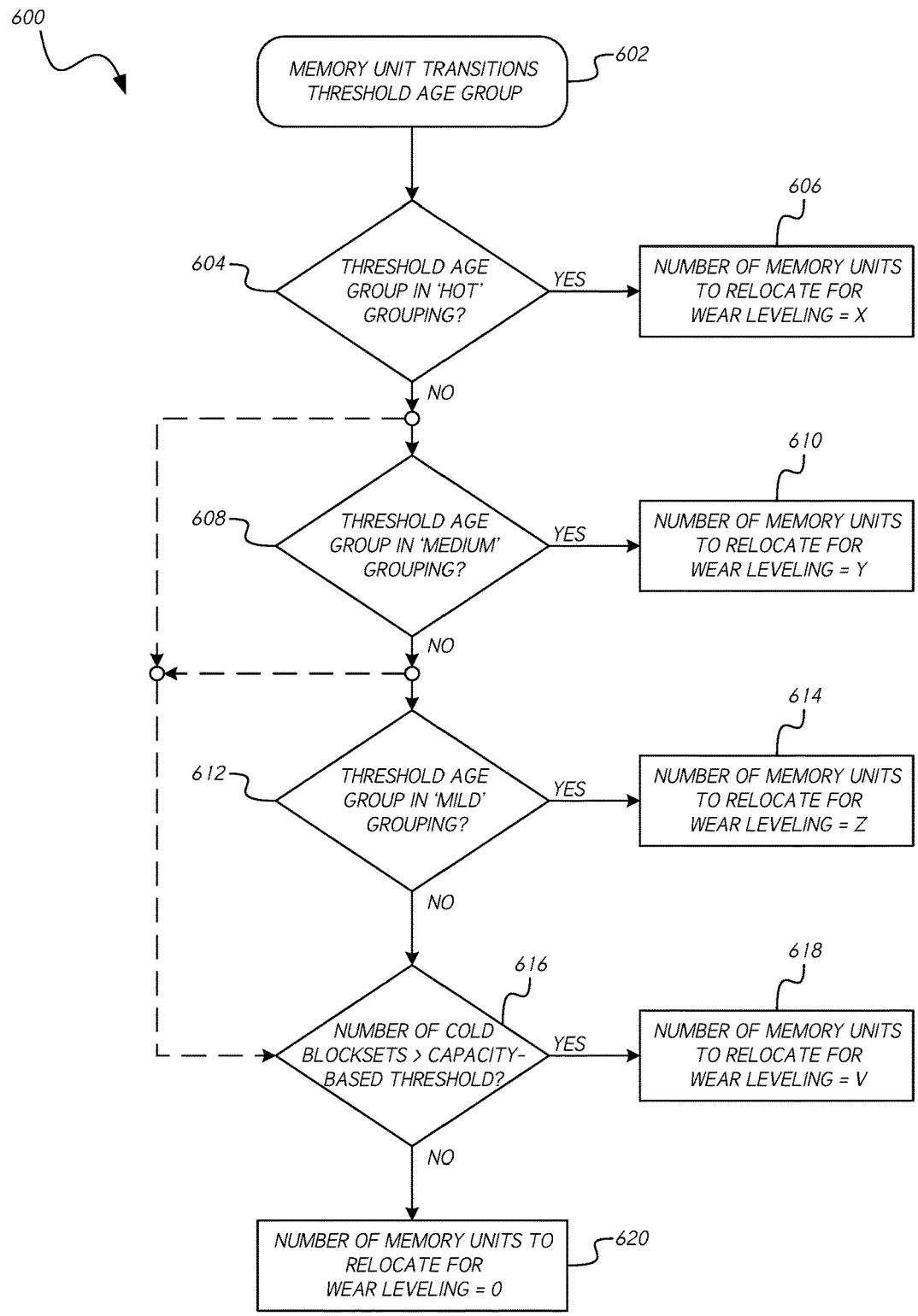
FIG. 6 is a flow diagram illustrating a process for performing capacity-aware wear leveling in accordance with one or more embodiments.

FIG. 6 is a flow diagram illustrating a process 600 for performing capacity-aware wear leveling in accordance with one or more embodiments of the present disclosure. The intensity/resolution of wear leveling implemented in solutions in accordance with the present disclosure may be at least partially defined in terms of the number of memory units (e.g., blocksets) requested or relocated in connection with a wear leveling operation. That is, in connection with a wear leveling operation, data stored in a number of memory units may be relocated to other memory units; the number of memory units from which data is relocated in connection with the wear leveling operation may define the intensity/resolution of the wear leveling operation.

Certain logic for calculating the resolution/intensity may be executed when a memory unit transitions from one age group of a wear leveling scheme to a next higher age group (i.e., hotter age group). As shown in FIG. 6, a memory unit transition from one age group to another occurs at block 602 of the process 600. For example, the transition at block 602 may involve transition of a memory unit into a threshold age group, such as a first age group of a defined grouping, as described in greater detail above in connection with FIGS. 2A and 2B. The occurrence of the transition at block 602 may trigger a wear leveling operation.

The intensity/resolution of the wear leveling operation may be determined based at least in part on the destination age group to which the relevant memory unit has transitioned. Furthermore, in certain embodiments, the intensity/resolution may be based at least in part on the number of memory units (e.g., blocksets) remaining in the coldest age group, or groups. The number of memory units designated for relocation in connection with the wear leveling operation may be based at least in part on a sum of a fixed value for the given threshold age group to which the memory unit has transitioned and a value proportional to the number of memory units in the coldest age group, or groups. As described herein, the relocation of memory units may involve the relocation of data stored in one or more physical memory units to one or more other hotter or colder physical memory units.

The blocks 604-620 illustrate the determination of the resolution/intensity of the wear leveling operation (e.g., the number of memory units needed to undergo the wear leveling operation) according to some embodiments. At decision block 604, it is determined whether the threshold age group (i.e., the age group to which the subject memory unit has transitioned according to block 602) is associated with a hottest grouping (e.g., 'HOT' grouping) of the age groups of the memory pool. If so, at block 606, the process 600 involves setting the resolution/intensity of the wear leveling operation to a first value X. For example, in one embodiment, the number of memory units (e.g., blocksets) designated for wear leveling may be set to an integer value N (e.g., 4) plus the quotient of the number M of memory units in the coldest age group (or grouping of the coldest age groups) and a predetermined divisor D (e.g., 128).

If the threshold age group is not from the hottest grouping, the process 600 proceeds to decision block 608, where it is determined whether the threshold age group is associated with a next-hottest grouping (e.g., 'MEDIUM' grouping) of the age groups of the memory pool. If so, at block 610, the process 600 involves setting the resolution/intensity of the wear leveling operation to a value Y that is less than the value X. For example, in one embodiment, the number of memory units (e.g., blocksets) designated for wear leveling in accordance with block 610 may be set to an integer value (e.g., N−1) plus the quotient of the number M of memory units in the coldest age group (or grouping of the coldest age groups) and a predetermined divisor K, which is greater than D. For example, the value K may be a multiple of the value D.

If the threshold age group is not from the second-hottest grouping, the process 600 proceeds to decision block 612, where it is determined whether the threshold age group is associated with a next-hottest grouping (e.g., 'MILD' grouping) of the age groups of the memory pool. If so, at block 614, the process 600 involves setting the resolution/intensity of the wear leveling operation to a value Z that is less than the values Y and/or X. For example, in one embodiment, the number of memory units (e.g., blocksets) designated for wear leveling in accordance with block 610 may equal to an integer value (e.g., N−2) plus the quotient of the number M of memory units in the coldest age group (or grouping of the coldest age groups) and a predetermined divisor L, which is greater than K. For example, the value L may be a multiple of the value K and/or the value D.

If the threshold age group is not from the third-hottest grouping, the process 600 proceeds to decision block 616, where it is determined whether the number of memory units (e.g., blocksets) in the coldest age group, or grouping of coldest age groups (e.g., the number of memory units in the two coldest age groups) is greater than a threshold value that is based at least in part on the capacity of the memory pool (e.g., the capacity of the solid-state drive). For example, the decision at block 616 may involve determining whether the number of cold memory units in the coldest age group(s) is greater than the quotient of the capacity (e.g., the total number of memory units) of the memory pool and an integer value (e.g., 2). If so, at block 618, the process 600 involves setting the resolution/intensity of the wear leveling operation to a value V that is less than the values Z, Y, and/or X. For example, in one embodiment, the number of memory units (e.g., blocksets) designated for wear leveling in accordance with block 610 may equal to an integer value (e.g., N−3) plus the quotient of the number M of memory units in the coldest age group (or grouping of the coldest age groups) and a predetermined divisor P, which is greater than L. For example, the value P may be a multiple of the value L, the value K and/or the value D. In certain embodiments, the decision block 616 further involves determining whether the coldest age group (or grouping of coldest age groups) has more memory units associated therewith than the next-hottest age group or grouping of age groups. For example, the process 600 may proceed to block 618 only when both the determination whether the number of cold memory units is greater than the capacity-based threshold and whether the coldest age group(s) have/has more memory units than the next-hottest memory group(s) are resolved in the affirmative.

In certain embodiments, the process 600 only proceeds to decision block 616 from decision block 612 when it is determined that the threshold age group is from a particular grouping, such as a 'COLD' or 'PRE-MILD' grouping. If not, the process may proceed to block 620 rather than to decision block 616.

The logic implemented in connection with decision block 616 may allow for capacity-aware wear leveling in accordance with certain embodiments disclosed herein. Although the described capacity-based threshold provides an example implementation of capacity-aware wear leveling, other logic, processes and/or mechanisms may be implemented to achieve capacity-aware wear leveling in accordance with the present disclosure.

Although not illustrated in the diagram of FIG. 6, in certain embodiments, if the threshold age group is not from the third-hottest grouping, the process 600 proceeds to another decision block (not shown), where it is determined whether the threshold age group is associated with a fourth-hottest grouping (e.g., 'COLD,' or 'PRE-MILD' grouping) of the age groups of the memory pool. If so, the process 600 may involve setting the resolution/intensity of the wear leveling operation to a value that is less than the value Z. In such embodiments, the process may proceed to decision block 616 when the threshold age group is determined not to belong to the fourth-hottest grouping.

Where decision block 616 is resolved in the negative, the process 600 may proceed to block 620, wherein the number of memory units selected for relocation in connection with the wear leveling operation may be set to zero. That is, the wear leveling operation may not be executed to relocate data stored in memory units. Alternatively, at block 620, the number of memory units to relocate may be set to a non-zero value that is less than the values V, Z, Y and/or X.

Although the diagram of FIG. 6 illustrates an orderly progression from decision block 604 to decision block 608, and from decision block 608 to decision block 612, in certain embodiments, the process 600 may bypass one or more of the illustrated blocks and proceed to the decision block 616, as illustrated by the dashed lines in FIG. 6. For example, the process may proceed to execute the capacity-based determination of block 616 in response to a negative determination at decision block 604 or 608.

The process 600 may be implemented or performed at least in part by a controller, or control circuitry, associated with a data storage device (e.g., a solid-state drive), such as the controller 130 shown in FIG. 1 and described above.

Additional Embodiments

Those skilled in the art will appreciate that in some embodiments, other types of data storage systems and/or programming schemes can be implemented. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage device comprising:
a nonvolatile solid-state memory comprising a plurality of blocks; and
a controller configured to:
maintain age data associated with each of a plurality of memory units, wherein each memory unit comprises one or more of the plurality of blocks;
determine a capacity of the nonvolatile solid-state memory; and
perform a wear leveling operation on a first memory unit of the plurality of memory units based at least in part on:
the age data associated with the first memory unit; and
the capacity of the nonvolatile solid-state memory, wherein a resolution of the wear leveling operation is inversely proportional to the capacity of the nonvolatile solid-state memory.

2. The data storage device of claim 1, wherein performing the wear leveling operation based on the capacity of the nonvolatile solid-state memory provides optimized wear leveling for the nonvolatile solid-state memory.

3. The data storage device of claim 1, wherein the controller is configured to perform the wear leveling operation according to a wear leveling scheme, wherein a resolution of the wear leveling scheme is based at least in part on the capacity of the nonvolatile solid-state memory.

4. The data storage device of claim 1, wherein the age data indicates program/erase cycle counts associated with each of the plurality of memory units.

5. The data storage device of claim 1, wherein the age data indicates bit error counts associated with each of the plurality of memory units.

6. The data storage device of claim 1, wherein the plurality of memory units are superblocks.

7. The data storage device of claim 1, wherein the controller is further configured to generate age-tracking data for the plurality of memory units at least in part by:
determining a plurality of memory unit age groups, wherein each of the plurality of age groups is associated with a range of program/erase cycles; and
associating each of the plurality of memory units with one of the plurality of age groups based on a program/erase cycle count associated with the respective memory unit.

8. The data storage device of claim 7, wherein the controller is configured to determine the plurality of age groups based on the capacity of the nonvolatile solid-state memory.

9. The data storage device of claim 7, wherein a number of the plurality of age groups is based on the capacity of the nonvolatile solid-state memory.

10. The data storage device of claim 7, wherein the controller is further configured to:
identify one or more of the plurality of age groups as a threshold age group; and determine that the first memory unit has transitioned to an age group identified as a threshold age group;
wherein said performing the wear leveling operation on the first memory unit is triggered by the determination that the first memory unit has transitioned to the age group identified as a threshold age group.

11. The data storage device of claim 10, wherein said identification of the one or more of the plurality of age groups as a threshold age group is based at least in part on the capacity of the nonvolatile solid-state memory.

12. The data storage device of claim 7, wherein the controller is further configured to:
determine that a number of memory units associated with one of the plurality of age groups is greater than a threshold; and
perform wear leveling in the nonvolatile solid-state memory based on the determination that the number of memory units associated with the one of the plurality of age groups is greater than the threshold;
wherein the threshold is based at least in part on the capacity of the nonvolatile solid-state memory.

13. A method of performing wear leveling in a data storage device, the method comprising:
determining age data associated with each of a plurality of memory units, wherein each of the plurality of memory units comprises one or more blocks of a nonvolatile solid-state memory;
determining a capacity of the nonvolatile solid-state memory; and
performing a wear leveling operation of a first memory unit of the plurality of memory units based at least in part on:
the age data associated with the first memory unit; and
the capacity of the nonvolatile solid-state memory, wherein a resolution of the wear leveling operation is inversely proportional to the capacity of the nonvolatile solid-state memory;
wherein the method is performed at least in part by a controller of the data storage device.

14. The method of claim 13, wherein the age data indicates program/erase cycle counts associated with each of the plurality of memory units.

15. The method of claim 14, wherein said performing the wear leveling operation on the first memory unit comprises relocating data stored in the first memory unit to a second memory unit of the plurality of memory units, wherein the program/erase cycle count associated with the second memory unit is less than the program/erase cycle count associated with the first memory unit.

16. The method of claim 13, wherein performing the wear leveling operation based at least in part on the capacity of the nonvolatile solid-state memory provides optimized wear leveling for the nonvolatile solid-state memory.

17. The method of claim 13, further comprising performing the wear leveling operation according to a wear leveling scheme, wherein a resolution of the wear leveling scheme is based at least in part on the capacity of the nonvolatile solid-state memory.

18. The method of claim 13, further comprising generating age-tracking data for the plurality of memory units at least in part by:
defining a plurality of memory unit age groups, wherein each of the plurality of age groups is associated with a range of program/erase cycles; and
associating each of the plurality of memory units with one of the plurality of age groups based on a program/erase cycle count associated with the respective memory unit.

19. The method of claim 18, wherein at least one of a number of the plurality of age groups and the range of program/erase cycles associated with each of the plurality of age groups is based at least in part on the capacity of the nonvolatile solid-state memory.

20. The method of claim 18, further comprising:
identifying one or more of the plurality of age groups as a threshold age group; and
determining that the first memory unit has transitioned to an age group identified as a threshold age group;
wherein said performing the wear leveling operation on the first memory unit is triggered by the determination that the first memory unit has transitioned to the age group identified as a threshold age group.

21. The method of claim 18, further comprising:
determining that a number of memory units associated with one of the plurality of age groups is greater than a threshold; and
performing wear leveling in the nonvolatile solid-state memory based on the determination that the number of memory units associated with the one of the plurality of age groups is greater than the threshold;
wherein the threshold is based at least in part on the capacity of the nonvolatile solid-state memory.

22. A data storage device comprising:
a nonvolatile solid-state memory comprising a plurality of blocks of memory;
a volatile memory;
means for maintaining, in the volatile memory, age data associated with each of a plurality of memory units comprising one or more of the plurality of blocks of memory;
means for determining a capacity of the nonvolatile solid-state memory; and
means for performing a wear leveling operation on a first memory unit of the plurality of memory units based at least in part on:
the age data associated with the first memory unit; and
the capacity of the nonvolatile solid-state memory, wherein a resolution of the wear leveling operation is inversely proportional to the capacity of the nonvolatile solid-state memory.

23. The data storage device of claim 22, the wear leveling operation is performed based on age-tracking data for the plurality of memory units, wherein the age-tracking data is based at least in part on the capacity of the nonvolatile solid-state memory.

24. The data storage device of claim 23, wherein the age-tracking data indicates a designation of the first memory unit as being associated with one of a plurality of age groups, wherein a number of the plurality of age groups is based on the capacity of the nonvolatile solid-state memory.

* * * * *